US012671774B2

(12) United States Patent
Xie

(10) Patent No.: US 12,671,774 B2
(45) Date of Patent: Jun. 30, 2026

(54) IMAGE READING APPARATUS AND IMAGE FORMING APPARATUS

(71) Applicant: CANON KABUSHIKI KAISHA, Tokyo (JP)

(72) Inventor: Jianxun Xie, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 18/676,270

(22) Filed: May 28, 2024

(65) Prior Publication Data

US 2024/0406330 A1 Dec. 5, 2024

(30) Foreign Application Priority Data

Jun. 1, 2023 (JP) ................................. 2023-091096

(51) Int. Cl.
*B41J 25/308* (2006.01)
*H04N 1/00* (2006.01)
*H04N 1/053* (2006.01)

(52) U.S. Cl.
CPC ............ *H04N 1/053* (2013.01); *B41J 25/308* (2013.01); *H04N 1/00798* (2013.01); *H04N 2201/0081* (2013.01)

(58) Field of Classification Search
CPC .............. B41J 29/393; B41J 2029/3935; B41J 2203/01; B41J 25/308
See application file for complete search history.

(56) References Cited

U.S. PATENT DOCUMENTS

| | | | | |
|---|---|---|---|---|
| 2009/0174749 | A1* | 7/2009 | Kemma | ................... B41J 3/543 |
| | | | | 347/37 |
| 2023/0030207 | A1* | 2/2023 | Yamamoto | ......... H04N 1/00588 |
| 2023/0412749 | A1* | 12/2023 | Arimoto | .............. H04N 1/0312 |

FOREIGN PATENT DOCUMENTS

| | | |
|---|---|---|
| JP | 2014160950 A | 9/2014 |
| JP | 2022109351 A | 7/2022 |
| JP | 2023004032 A | 1/2023 |

* cited by examiner

*Primary Examiner* — Scott A Richmond
(74) *Attorney, Agent, or Firm* — Canon U.S.A., Inc., IP Division

(57) ABSTRACT

An image reading apparatus includes a support portion, a reading unit, and a first movable unit. The first movable unit moves the reading unit in a second direction, where a conveyance direction in which a sheet is conveyed in a conveyance path is defined as a first direction, a width direction of a first surface of the sheet orthogonal to the first direction is defined as the second direction, and a direction orthogonal to the first direction and the second direction is defined as a third direction. The first movable unit moves the reading unit between a first position and a second position. The first position is a position where a reading surface of the reading unit and the support portion face each other, and the second position is a position where the reading surface of the reading unit and the support portion do not face each other.

14 Claims, 11 Drawing Sheets

IMAGE READING APPARATUS AND IMAGE FORMING APPARATUS

BACKGROUND

Field

The present disclosure relates to an image reading apparatus that reads an image formed on a sheet, and an image forming apparatus including the image reading apparatus.

Description of the Related Art

The image forming apparatus is provided with an image reading apparatus for reading an image formed on a sheet. The image reading apparatus includes a reading unit including a glass disposed at a position facing the sheet that is being conveyed and an image sensor that reads the image on the sheet via the glass (see JP 2022-109351 A). In the apparatus described in JP 2022-109351 A, in order to detach the reading unit from a casing, a reading unit and a backing unit are provided to be rotatable with a first end side of the backing unit that conveys the sheet in a width direction intersecting a conveyance direction of the sheet as the rotation center.

Meanwhile, dust from ink, toner, paper, and the like used for forming an image is likely to adhere to the glass of the reading unit. In the apparatus described in JP 2022-109351 A, an opening angle between the reading unit and the backing unit is limited, and a distance between the reading unit and the backing unit is narrower at a first end than at a second end that is opened.

SUMMARY

According to an aspect of the present disclosure, an image reading apparatus includes a support portion configured to support a second surface of a sheet with an image formed on a first surface of the sheet in a conveyance path where the sheet is conveyed, a reading unit disposed on one side opposite to another side on which the support portion is disposed across the conveyance path, and configured to read the first surface of the sheet conveyed in the conveyance path, and a first movable unit configured to move the reading unit in a second direction, where a conveyance direction in which the sheet is conveyed in the conveyance path is defined as a first direction, a width direction of the first surface of the sheet orthogonal to the first direction is defined as the second direction, and a direction orthogonal to the first direction and the second direction is defined as a third direction, wherein the first movable unit is configured to move the reading unit between a first position and a second position, and wherein the first position is a position where a reading surface of the reading unit and the support portion face each other, and the second position is a position where the reading surface of the reading unit and the support portion do not face each other.

Further features of the present disclosure will become apparent from the following description of exemplary embodiments with reference to the attached drawings.

DESCRIPTION OF THE EMBODIMENTS

Figure 1:
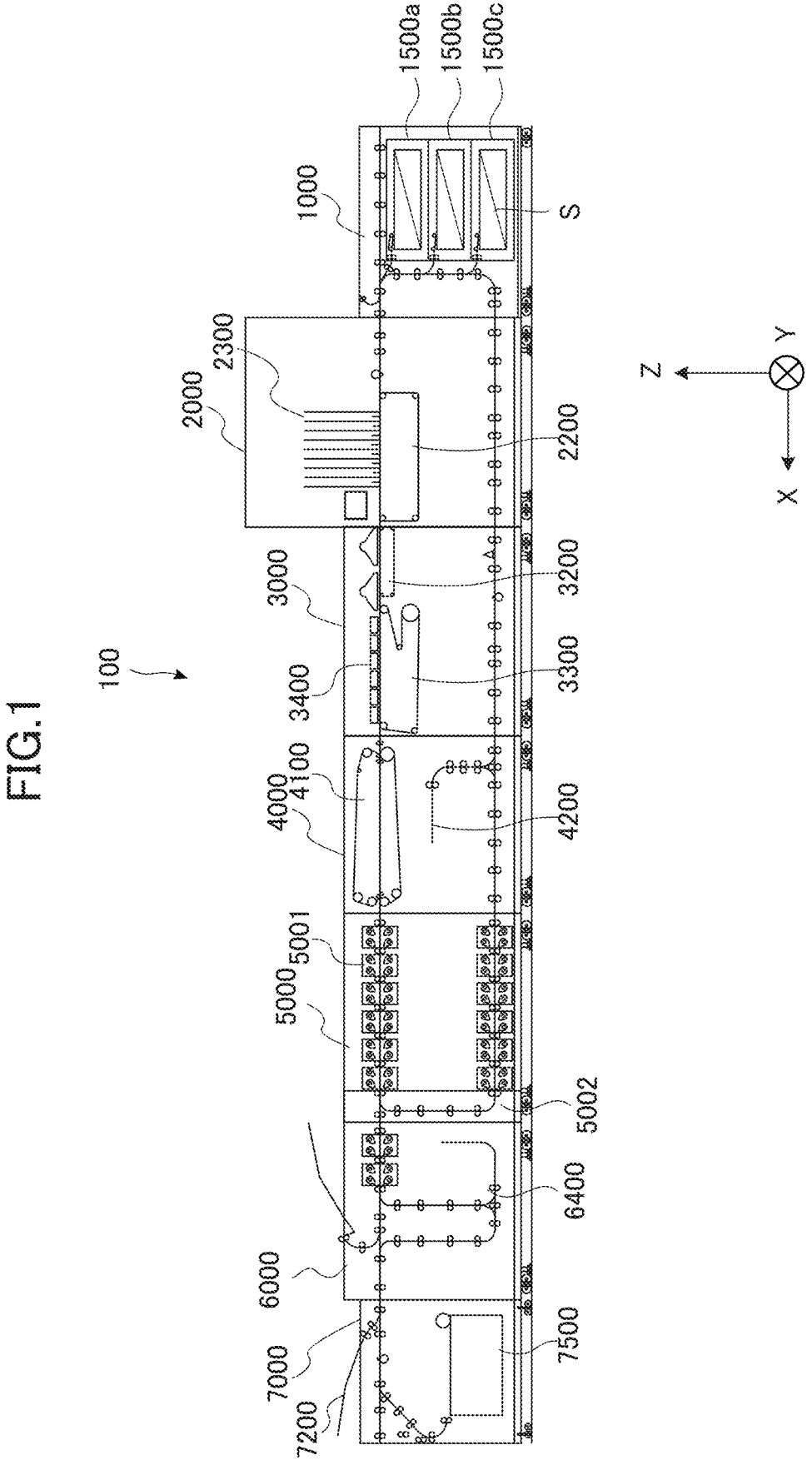
FIG. 1 is a schematic view showing an inkjet recording apparatus.

Hereinafter, an embodiment of the present disclosure will be described with reference to the drawings. First, an inkjet recording apparatus will be described as an example of an image forming apparatus according to the present embodiment with reference to FIG. 1. The inkjet recording apparatus 100 illustrated in FIG. 1 is a so-called sheet-fed inkjet recording apparatus that forms an image on a sheet using an ink. The sheet may be, for example, a recording material capable of accepting an ink, e.g. paper such as plain paper or thick paper, a plastic film such as a sheet for an overhead projector, a sheet having a special shape such as an envelope or index paper, or cloth.

Inkjet Recording Apparatus

As illustrated in FIG. 1, the inkjet recording apparatus 100 includes a sheet feeding module 1000, a print module 2000, a drying module 3000, a fixing module 4000, a cooling module 5000, a reversing module 6000, and a stacking module 7000. When a sheet S supplied from the sheet feeding module 1000 is subjected to various processes while being conveyed into the respective modules along a conveyance path, and is finally discharged to the stacking module 7000.

Note that the sheet feeding module 1000, the print module 2000, the drying module 3000, the fixing module 4000, the cooling module 5000, the reversing module 6000, and the stacking module 7000 may have separate casings, respectively, and the casings may be connected to each other to constitute the inkjet recording apparatus 100. Alternatively, the sheet feeding module 1000, the print module 2000, the drying module 3000, the fixing module 4000, the cooling module 5000, the reversing module 6000, and the stacking module 7000 may be disposed in one casing.

The sheet feeding module 1000 includes storage compartments 1500a, 1500b, and 1500c that store sheets S, and the storage compartments 1500a to 1500c are provided to be drawable toward the front side of the apparatus in order to store sheets S. The sheets S are fed one by one by a separation belt and a conveyance roller in each of the storage compartments 1500a to 1500c, and conveyed to the print module 2000. The number of storage compartments 1500a to 1500c is not limited to three, and may be one, two, or four or more. The print module 2000 will be described below (see FIG. 2).

The drying module 3000 includes a decoupling unit 3200, a drying belt unit 3300, and a warm air blowing unit 3400. The drying module 3000 reduces the liquid content of the ink applied to the sheet S in order to enhance the fixability of the ink to the sheet S by the fixing module 4000 at the subsequent stage. The sheet S on which an image is formed is conveyed to the decoupling unit 3200 disposed in the drying module 3000. In the decoupling unit 3200, a frictional force is generated between the sheet S and the belt by the wind pressure of the wind blown from above, and the sheet S is conveyed by the belt.

The sheet S conveyed from the decoupling unit 3200 is conveyed in an adhering state by the drying belt unit 3300, and the ink applied to the sheet S is dried by warm air blown from the warm air blowing unit 3400 disposed above the belt. By heating the ink applied to the sheet S through the drying module 3000 and accelerating evaporation of moisture, it is possible to suppress an occurrence of so-called cockling in which the ink is scattered on the sheet S and a border-like line is formed around the sheet S. As the drying module 3000, any device may be used as long as it is capable of drying the ink in a heating manner. For example, a hot air dryer or a heater is preferable. As an example of the heater, an electric wire heater or an infrared heater is preferable from the viewpoint of heating safety and heating energy efficiency.

The fixing module 4000 includes a fixing belt unit 4100. The fixing belt unit 4100 fixes the ink onto the sheet S by passing the sheet S conveyed from the drying module 3000 between a heated upper belt unit and a lower belt unit.

The cooling module 5000 includes a plurality of cooling units 5100, and cools the high-temperature sheet S conveyed from the fixing module 4000 through the cooling units 5100. For example, the cooling units 5100 cool the sheet S, for example, by taking outside air into a cooling box using a fan to increase the pressure in the cooling box, and applying air blown from the cooling box through a nozzle by the pressure to the sheet S. The cooling units 5100 are disposed on both sides of the conveyance path for the sheet S to cool both surfaces of the sheet S.

The cooling module 5000 is provided with a conveyance path switching unit 5002. The conveyance path switching unit 5002 switches the conveyance path for the sheet S depending on whether the sheet S is to be conveyed to the reversing module 6000 or the sheet S is to be conveyed to a double-sided printing conveyance path for double-sided printing to form images on both sides of the sheet S.

The reversing module 6000 includes a reversing unit 6400. The reversing unit 6400 reverses the front and back sides of the conveyed sheet S to change the front and back sides of the sheet S when the sheet S is discharged to the stacking module 7000. The stacking module 7000 includes a top tray 7200 and a stacking portion 7500, and stacks the sheet S conveyed from the reversing module 6000.

During double-sided printing, the sheet S is conveyed to a conveyance path below the cooling module 5000 by the conveyance path switching unit 5002. Thereafter, the sheet S is returned to the print module 2000 through the double-sided conveyance path including the fixing module 4000, the drying module 3000, the print module 2000, and the sheet feeding module 1000. A double-sided printing conveyance unit of the fixing module 4000 is provided with a reversing unit 4200 that reverses the front and back sides of the sheet S. After an image is formed by an ink on the other surface where no image is formed of the sheet S returned to the print module 2000, the sheet S is discharged to the stacking module 7000 through the drying module 3000, the fixing module 4000, the cooling module 5000, and the reversing module 6000.

Print Module

4

Figure 2:
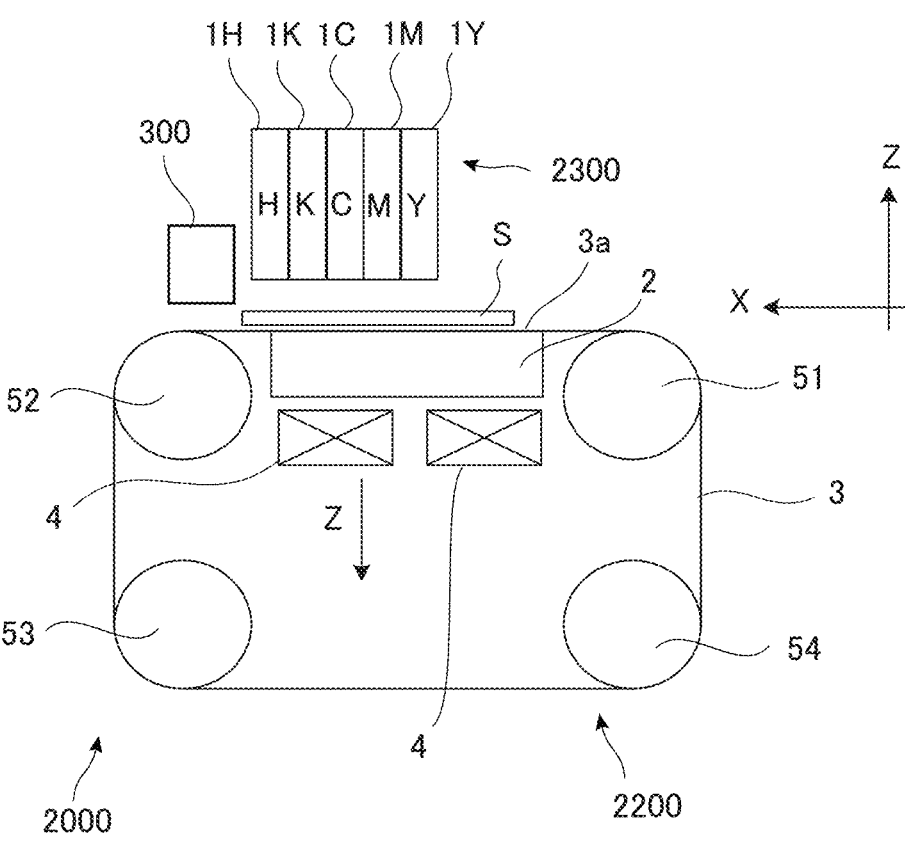
FIG. 2 is a schematic diagram illustrating a print module.

Next, the print module 2000 will be described with reference to FIG. 2. As illustrated in FIG. 2, the print module 2000 includes a pre-image formation registration correction unit (not illustrated), a print belt unit 2200, and a recording unit 2300. A sheet S conveyed from the sheet feeding module 1000 is conveyed to the print belt unit 2200 after the inclination and the position of the sheet are corrected by the pre-image formation registration correction unit.

The recording unit 2300 is disposed at a position facing the print belt unit 2200 with respect to the conveyance path for the sheet S. The recording unit 2300 forms an image when recording heads 1Y, 1M, 1C, 1K, and 1H serving as an image forming portion eject inks from above onto the front surface (first surface) of the sheet S that is being conveyed.

In the present embodiment, a total of five line-type recording heads 1Y, 1M, 1C, 1K, and 1H corresponding to four colors of yellow (Y), magenta (M), cyan (C), and black (Bk) and a reaction liquid are arranged along a direction in which the sheet S is conveyed (a direction indicated by arrow X). However, the number of ink colors and the number of recording heads are not limited to five. Further, as an inkjet method for discharging an ink, a method using a heat generating element, a method using a piezoelectric element, a method using an electrostatic element, a method using a MEMS element, or the like can be adopted. The ink of each color is supplied to the recording head from an ink tank that is not illustrated via an ink tube.

The sheet S is conveyed in an adhering state by the print belt unit 2200. In addition, the print belt unit 2200 is provided with a mechanism (not illustrated) that adjusts a height of a facing region 3a facing the recording heads 1Y to 1H and a scanner unit 300 to be described below so that the sheet S is conveyed while maintaining a constant clearance between the recording heads 1Y to 1H and the scanner unit 300. The print belt unit 2200 includes an endless conveyor belt 3, a plurality of stretching rollers 51, 52, 53, and 54 that rotatably stretch the conveyor belt 3, a platen unit 2, and a suction fan 4.

The conveyor belt 3 serving as a support portion is disposed below the recording heads 1Y to 1H in the vertical direction, and conveys the sheet S by rotating while supporting the back surface (second surface) of the sheet S with an image being formed on the front surface thereof by the recording heads 1Y to 1H in the conveyance path for conveying the sheet S. In the present embodiment, the conveyor belt 3 is stretched by a pair of stretching rollers 51 and 52 on both sides of the facing region 3a facing the recording heads 1Y to 1H in the rotation direction. At least one of the stretching rollers 51, 52, 53, and 54 is a driving roller that drives the conveyor belt 3 to rotate.

The sheet S is conveyed in an adhering state on an outer peripheral surface of the conveyor belt 3 that is rotating to secure a clearance with the recording heads 1Y to 1H (specifically, ejection ports of the respective nozzles) at a predetermined distance. To do so, a large number of fine holes allowing air to pass therethrough are formed in the conveyor belt 3 over its entire perimeter, and the suction fan 4 is disposed below the conveyor belt 3 and the platen unit 2 to be described below in the vertical direction. The suction fan 4 sucks air downward (in a direction indicated by arrow Z) to cause the sheet S to adhere onto the outer peripheral surface of the conveyor belt 3. Here, two suction fans 4 themselves are arranged at the illustrated positions, but the arrangement of the suction fans is not limited thereto. Although not illustrated, suction ports of ducts connected to the suction fans arranged at other positions may be arranged at the illustrated positions of the suction fans 4.

A scanner unit 300 serving as a reading unit is disposed downstream of the recording unit 2300 in the conveyance direction. The sheet S on which the image is formed by the recording unit 2300 is conveyed to the scanner unit 300 by the print belt unit 2200, and the image on the sheet S is read by the scanner unit 300.

Scanner Unit

Figure 3:
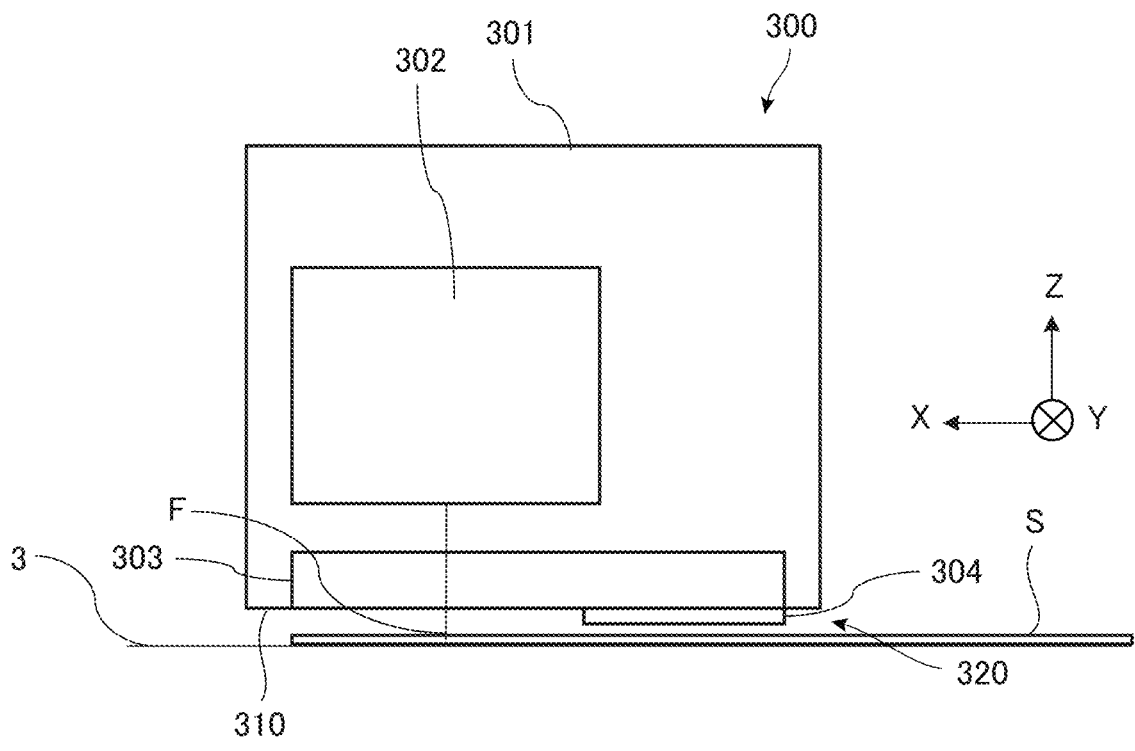
FIG. 3 is a schematic diagram illustrating a scanner unit.

The scanner unit 300 will be described with reference to FIG. 3. As illustrated in FIG. 3, the scanner unit 300 is disposed to face the conveyor belt 3, and reads an image formed on the sheet S through a reading surface 310 facing the front surface of the sheet S conveyed in a conveyance path 320. The scanner unit 300 includes a reading portion 302 that reads an image of the sheet by emitting light to the sheet S that is being conveyed and receiving light reflected from the sheet S, and a housing 301 that houses the reading portion 302. A transmission glass 303 serving as a transmission portion capable of transmitting the light emitted from the reading portion 302 and the light reflected from the sheet S, and a shading sheet 304 for performing a shading correction to reduce unevenness in light amount and the like are disposed on the reading surface 310 of the housing 301.

The print module 2000 adjusts a condition for executing an image forming operation based on the image information acquired by the reading portion 302. For example, when the image is aligned with respect to the sheet S, rectangular patch images are output to the four corners of the sheet S, and the positions of the patch images with respect to the four sides of the sheet S are obtained from the image information on the patch images read by the reading portion 302. In order to correct errors between predetermined image positions determined in advance and actual positions of the patch images, the print module 2000 can adjust parameters representing the position, magnification, rotation angle, and the like of the image to be formed on the sheet S in the main scanning direction and the sub-scanning direction. Thereafter, the print module 2000 controls the recording heads 1Y to 1H using the adjusted parameters, and executes an image forming operation for obtaining an outcome having an adjusted image forming position.

Lifting/Lowering Unit

Figure 4:
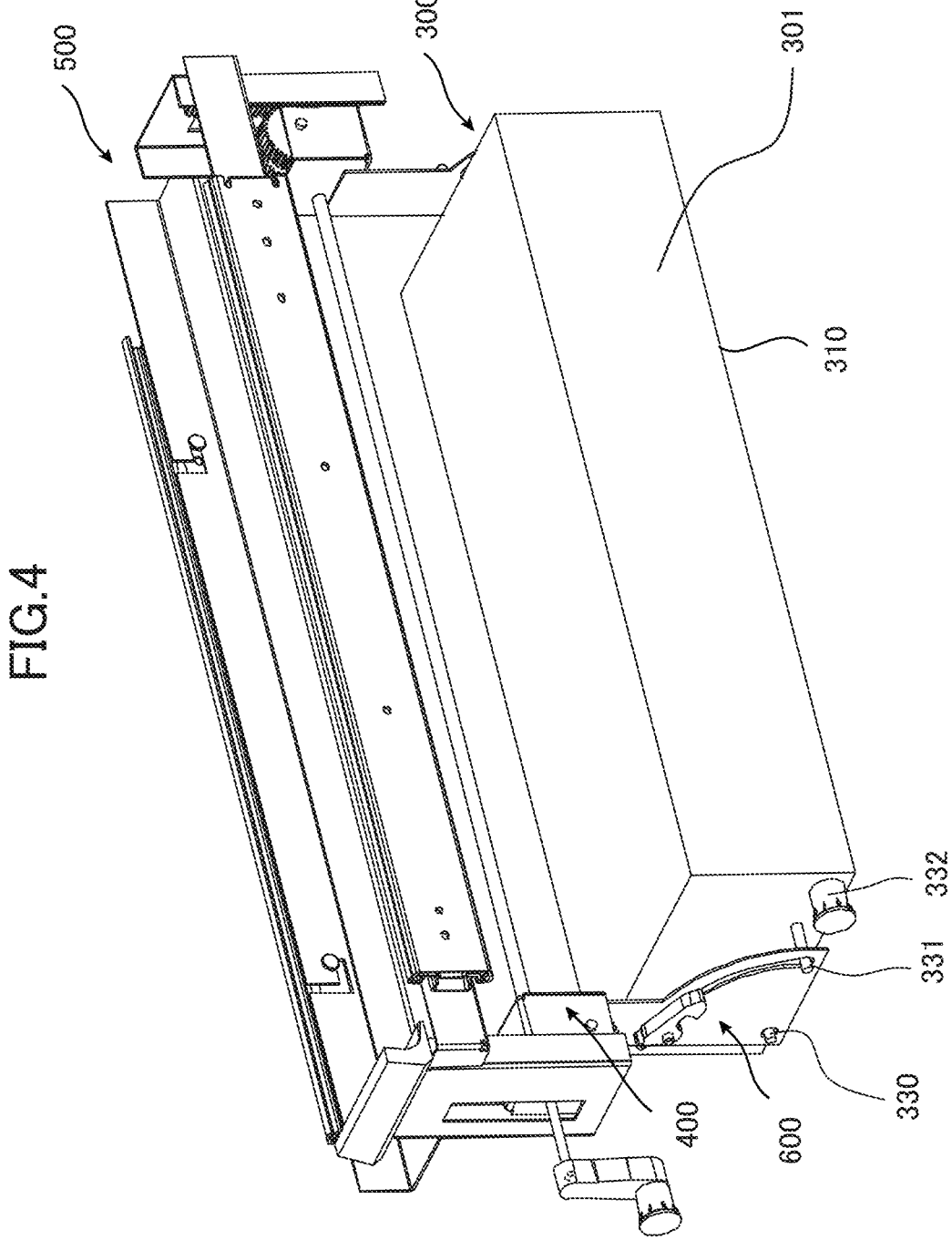
FIG. 4 is a perspective view illustrating a case where the scanner unit is located at a reading position.
Figure 5:
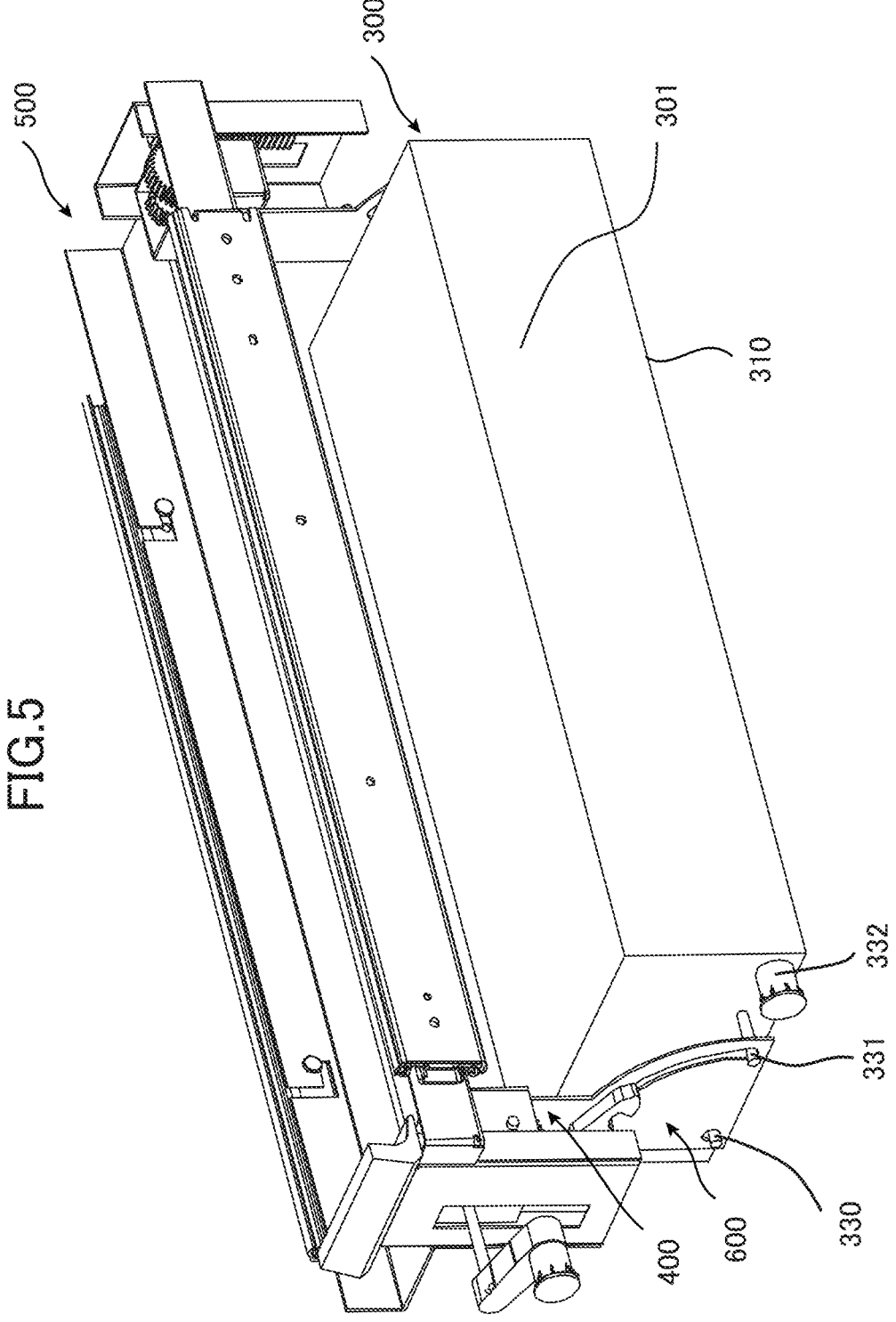
FIG. 5 is a perspective view illustrating a case where the scanner unit is located at a separated position.

In the present embodiment, the scanner unit 300 is provided to be movable between a reading position where the image on the sheet S can be read by the reading portion 302 and a separated position that is further away from the conveyor belt 3 (the conveyance path for the sheet) than the reading position in a direction intersecting the front surface of the sheet S conveyed in the conveyance path 320 (here, the vertical direction). FIG. 4 illustrates a case where the scanner unit 300 is located at the reading position, and FIG. 5 illustrates a case where the scanner unit 300 is located at the separated position. As illustrated in FIGS. 4 and 5, the scanner unit 300 is moved between the reading position and the separated position in the vertical direction by a lifting/lowering unit 400 (also referred to as a second movable unit) serving as a contacting/separating portion in a state where the transmission glass 303 faces the conveyor belt 3 downward in the vertical direction (see FIG. 3). In the present embodiment, when the scanner unit 300 is located at the reading position or at the separated position, the reading surface 310 is located at a facing position facing the conveyor belt 3.

Figure 6:
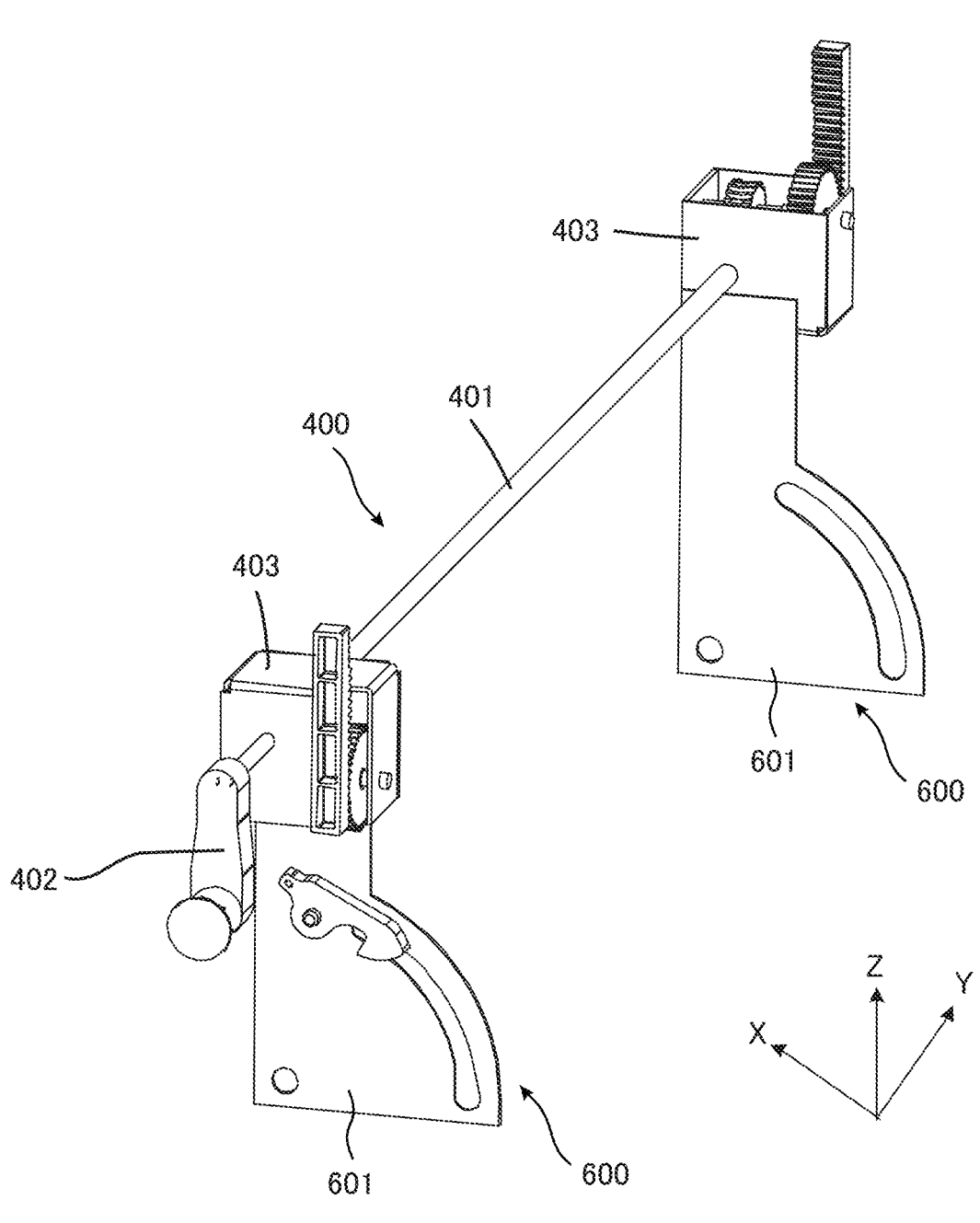
FIG. 6 is a perspective view illustrating a lifting/lowering unit and a rotatable unit.

The lifting/lowering unit 400 will be described using FIGS. 6 and 7 while referring to FIGS. 2 and 3. As illustrated in FIG. 6, the lifting/lowering unit 400 includes a rotation shaft 401, a handle 402, and a pair of lifting/lowering portions 403. The rotation shaft 401 extends in a direction (referred to as a direction indicated by arrow Y or a width direction) orthogonal to a conveyance direction (a direction indicated by arrow X) in which the sheet S is conveyed in the conveyance path 320. A direction orthogonal to each of the direction indicated by arrow X and the direction indicated by arrow Y is a direction indicated by arrow Z (also referred to as a vertical direction). The handle 402 is fixed to a first end of the rotation shaft 401 in the width direction so that the handle 402 can be gripped by a user (operator) to rotate the rotation shaft 401.

The pair of lifting/lowering portions 403 are disposed to face each other at both ends of the rotation shaft 401 in the width direction, and rotatably supports the rotation shaft 401. The lifting/lowering portions 403 lift or lower the scanner unit 300 in the vertical direction according to the rotation of the rotation shaft 401. However, a holding plate 601 is provided downward of each of the lifting/lowering portions 403 in the vertical direction, and the holding plate 601 rotatably holds the scanner unit 300 as will be described below. In the present embodiment, when the user rotates the handle 402, the holding plates 601 move in the vertical direction together with the lifting/lowering portions 403 and the rotation shaft 401, and the scanner unit 300 held by the holding plates 601 moves up or down accordingly.

Figure 7:
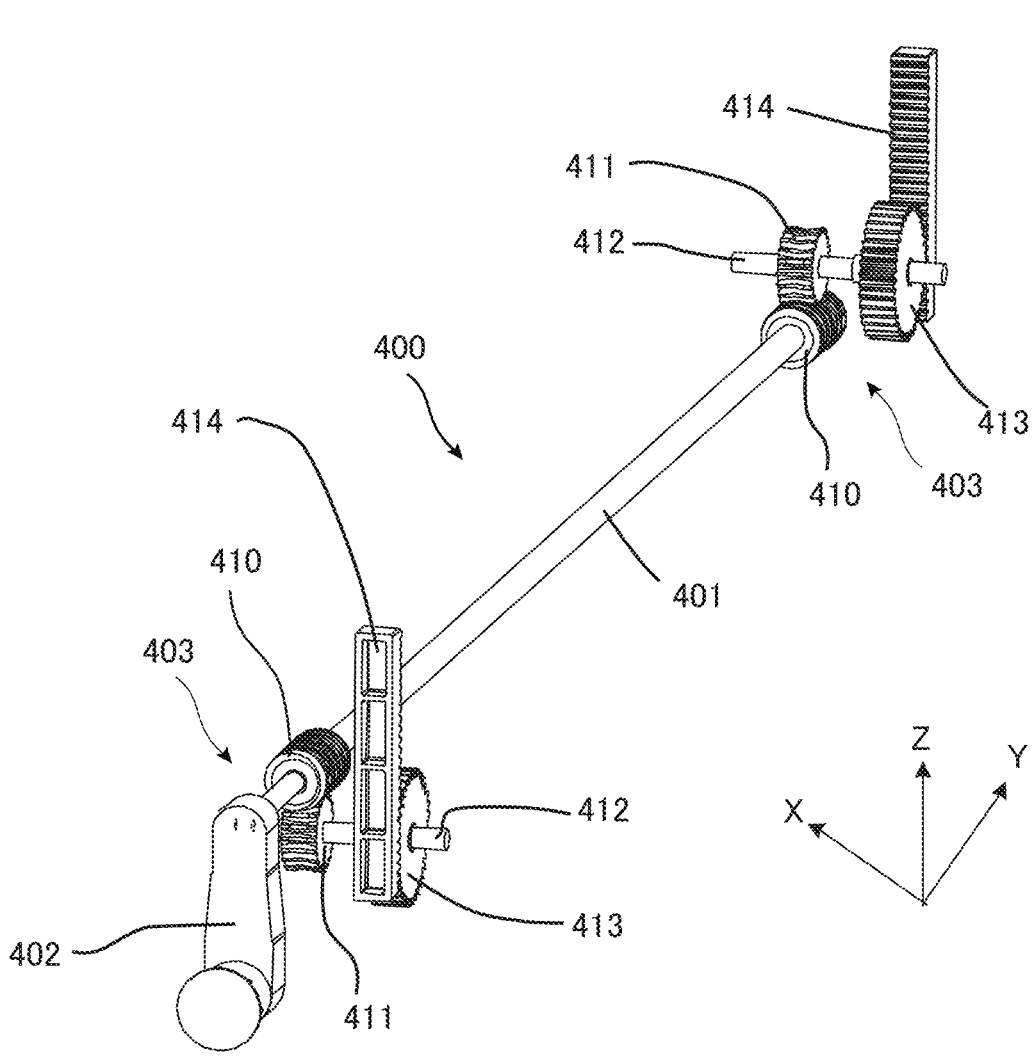
FIG. 7 is a perspective view illustrating the lifting/lowering unit.

As illustrated in FIG. 7, the lifting/lowering portion 403 includes a worm gear 410 fixed to the rotation shaft 401, a worm wheel 411 meshed with the worm gear 410, a pinion gear 413 connected to the worm wheel 411 via a gear shaft 412, and a rack gear 414 meshed with the pinion gear 413. The worm gear 410, the worm wheel 411, and the pinion gear 413 are housed in a case as illustrated in FIG. 6. On the other hand, the rack gear 414 is fixed to a movable frame 502 (see FIG. 9) to be described below so that a gear train meshed with the pinion gears 413 is disposed in the vertical direction.

In the present embodiment, the worm wheel 411 is disposed under the worm gear 410 in the lifting/lowering portion 403 on a first end side in the width direction where the handle 402 is provided, and the worm wheel 411 is disposed on the worm gear 410 in the lifting/lowering portion 403 on a second end side in the width direction. In this manner, in the pair of lifting/lowering portions 403 disposed on both end sides in the width direction, since the worm gears 410 are meshed with the worm wheels 411 at exactly opposite positions between the upper and lower positions in the vertical direction, the pinion gears 413 do not move downward in the vertical direction by gravity with respect to the rack gears 414. That is, unless the rotation shaft 401 is rotated, the brake is applied by the worm wheels 411 and the worm gears 410, and the scanner unit 300 is maintained in a stopped state without moving downward in the vertical direction by its own weight.

Figure 8:
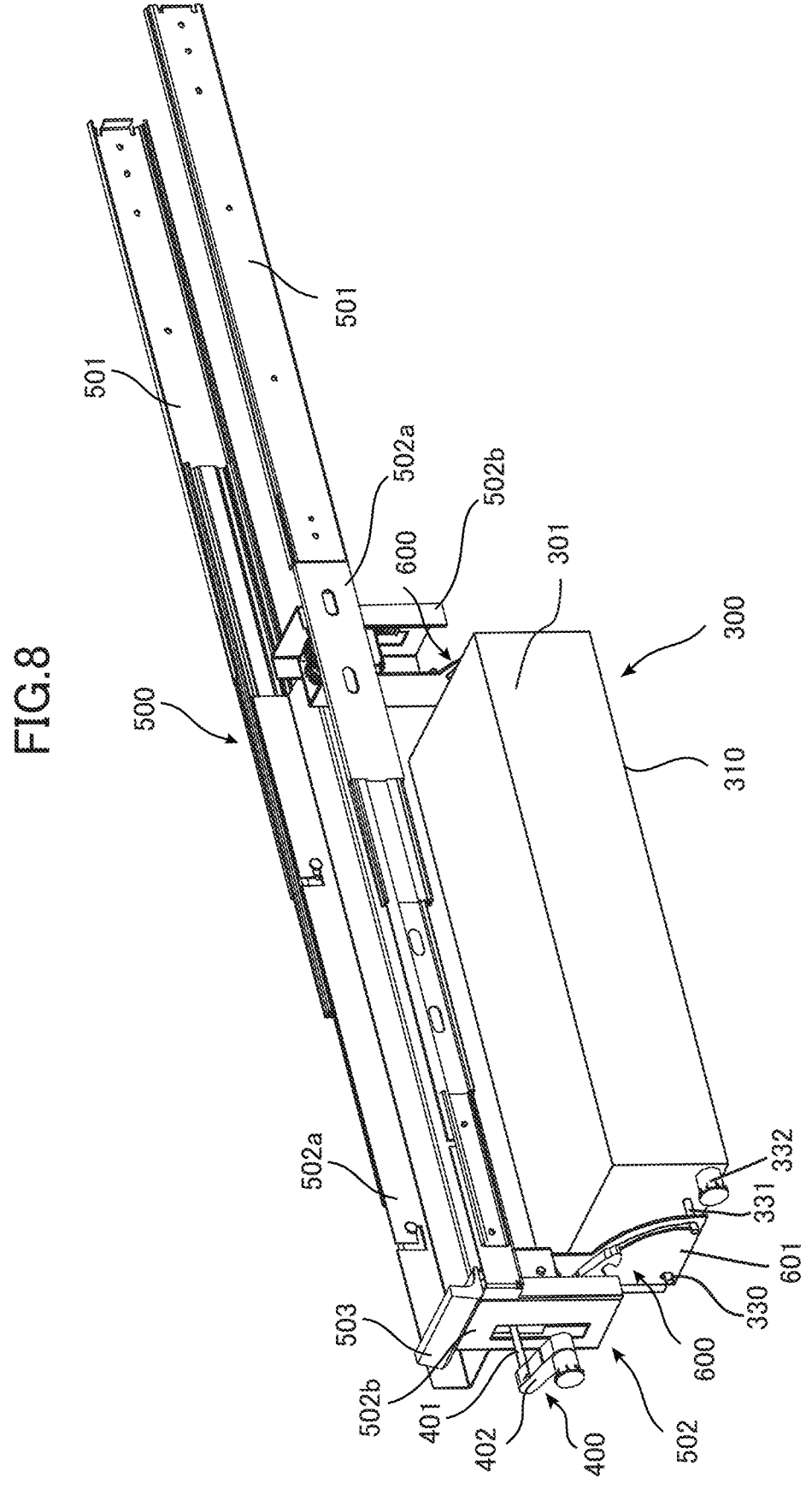
FIG. 8 is a perspective view illustrating a case where the scanner unit is located at a non-facing position.

According to the lifting/lowering unit 400 described above, the user can lift or lower the scanner unit 300 in the vertical direction by operating the handle 402. In the present embodiment, when the user wants to clean the transmission glass 303 of the scanner unit 300, the user first needs to move the scanner unit 300 from the reading position (see FIG. 4) to the separated position (see FIG. 5). In this case, the user grips the handle 402 and operates the handle 402 to rotate the rotation shaft 401 in the clockwise direction. Then, the worm gears 410 rotate together with the rotation shaft 401, the worm wheels 411 are driven by the worm gears 410, and the pinion gears 413 connected to the worm wheels 411 via the gear shafts 412 are rotated. As the pinion gears 413 rotate, the pinion gears 413 moves upward in the vertical direction along the rack gears 414 on which the gear trains are disposed in the vertical direction. As a result, the lifting/lowering portions 403 moves upward in the vertical direction, and accordingly, the scanner unit 300 held by the holding plates 601 moves to the separated position.
Drawer Unit In addition, the scanner unit 300 is provided to be movable in the width direction between a facing position where the reading surface 310 faces the conveyor belt 3 and a non-facing position where the reading surface 310 does not face the conveyor belt 3 in a state where the scanner unit 300 is located at the above-described separated position that is further away from the conveyor belt 3 than the reading position (see FIG. 5). FIG. 8 illustrates a case where the scanner unit 300 is located at the non-facing position. As illustrated in FIG. 8, the scanner unit 300 moves in a sliding manner between the separated position (facing position) and the non-facing position in the width direction by a drawer unit 500 (also referred to as a first movable unit) serving as a movable unit in a state where the transmission glass 303 is directed downward in the vertical direction (see FIG. 3).

Figure 9:
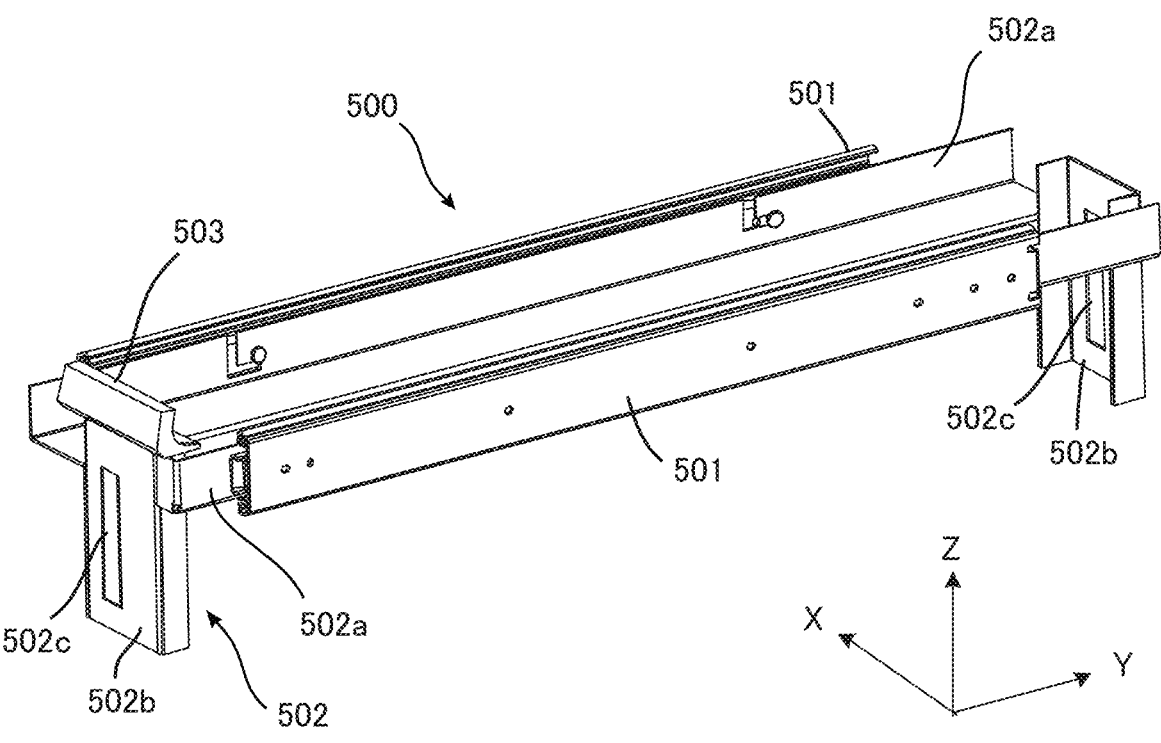
FIG. 9 is a perspective view illustrating a drawer unit.

The drawer unit 500 will be described using FIG. 9 with reference to FIGS. 7 and 8. Note that FIG. 9 illustrates a state in which the scanner unit 300 is located at the separated position, that is, a state before the scanner unit 300 is drawn out to the non-facing position. As illustrated in FIG. 9, the drawer unit 500 includes a pair of slide rails 501 extending in the width direction at a distance therebetween in the conveyance direction, and a movable frame 502 holding the above-described lifting/lowering unit 400 (see FIG. 6) and provided to be movable in a sliding manner along the slide rails 501 between the separated position and the non-facing position. The slide rails 501 are fixed to the casing of the print module 2000.

The movable frame 502 has a pair of rail portions 502a at both ends in the conveyance direction, and these rail portions 502a are fitted to the slide rails 501 to be supported to be movable in a sliding manner. In addition, a frame gripping portion 503 to be gripped by the user to move the movable frame 502 in a sliding manner is provided on a first end side in the width direction of the movable frame 502.

The movable frame 502 includes a pair of lifting/lowering unit holding plates 502b disposed to face each other at both ends in the width direction. The rack gear 414 (see FIG. 7) of the lifting/lowering unit 400 is disposed inside the lifting/lowering unit holding plate 502b. In addition, a through hole 502c that supports the rotation shaft 401 of the lifting/lowering unit 400 is formed in the lifting/lowering unit holding plate 502b. The through hole 502c is formed in an elongated shape in which a length in the vertical direction is longer than a length in the conveyance direction in order not to hinder a movement in the vertical direction of the lifting/lowering unit 400 along the rack gear 414 and in order to regulate a movement in the conveyance direction of the lifting/lowering unit 400. As illustrated in FIG. 8, the handle 402 of the lifting/lowering unit 400 is fixed to the rotation shaft 401 outside the lifting/lowering unit holding plate 502b on the side where the frame gripping portion 503 is provided, so that the user can easily operate the handle.

In a case where the user wants to clean the transmission glass 303 of the scanner unit 300, the user needs to move the scanner unit 300 from the reading position (see FIG. 4) to the separated position (see FIG. 5) and then move the scanner unit 300 from the separated position (facing position) to the non-facing position (see FIG. 8). In this case, the user grips the frame gripping portion 503 and pulls the movable frame 502 forward (toward a direction opposite to a direction indicated by arrow Y in FIG. 9). Then, the movable frame

Figure 10:
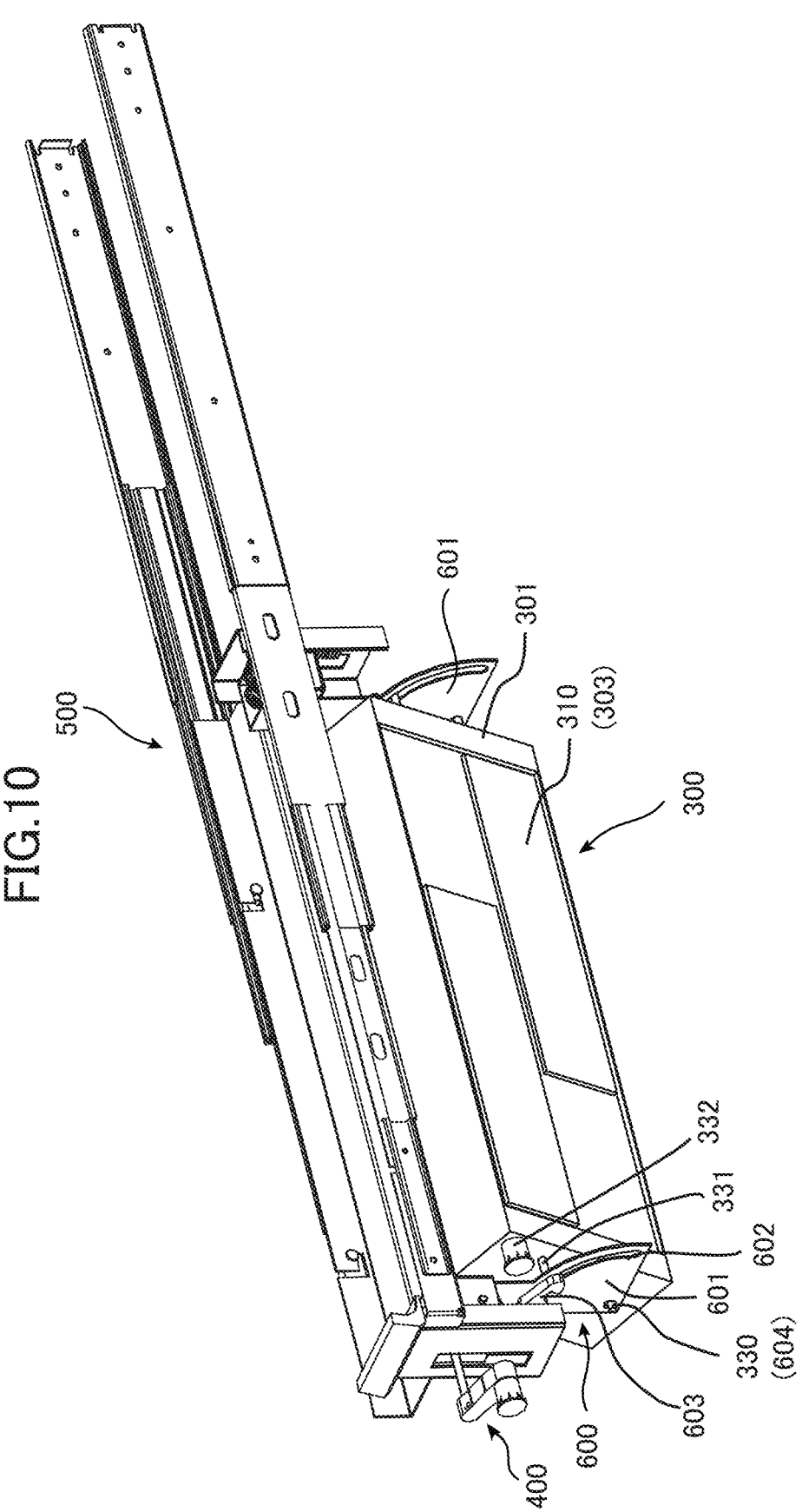
FIG. 10 is a perspective view illustrating a case where the scanner unit is located at an inclined position.

502 moves in a sliding manner to the non-facing position along the slide rails 501. As a result, the lifting/lowering unit 400 also moves to the non-facing position, and accordingly, the scanner unit 300 held by the holding plate 601 moves to the non-facing position. In the present embodiment, when the scanner unit 300 is located at the non-facing position, the scanner unit 300 is drawn out from the inside of the casing of the print module 2000 to the outside of the casing of the print module 2000 forward of the casing of the print module 2000, and the transmission glass 303 is exposed to the outside of the casing of the print module 2000.
Rotatable Unit In addition, the scanner unit 300 is provided to be rotatable between a non-facing position not where the reading surface 310 faces the conveyor belt 3 and an inclined position where the reading surface 310 is inclined at a predetermined angle with respect to the non-facing position in a state where the reading surface 310 is located at the non-facing position (see FIG. 8). FIG. 10 illustrates a case where the scanner unit 300 is located at the inclined position. The scanner unit 300 is rotated by a rotatable unit 600 serving as a rotatable portion between a non-facing position (see FIG. 8) where the transmission glass 303 of the reading surface 310 faces downward in the vertical direction and an inclined position where the reading surface 310 is inclined at a predetermined angle as illustrated in FIG. 10.

Figures 11A, 11B:
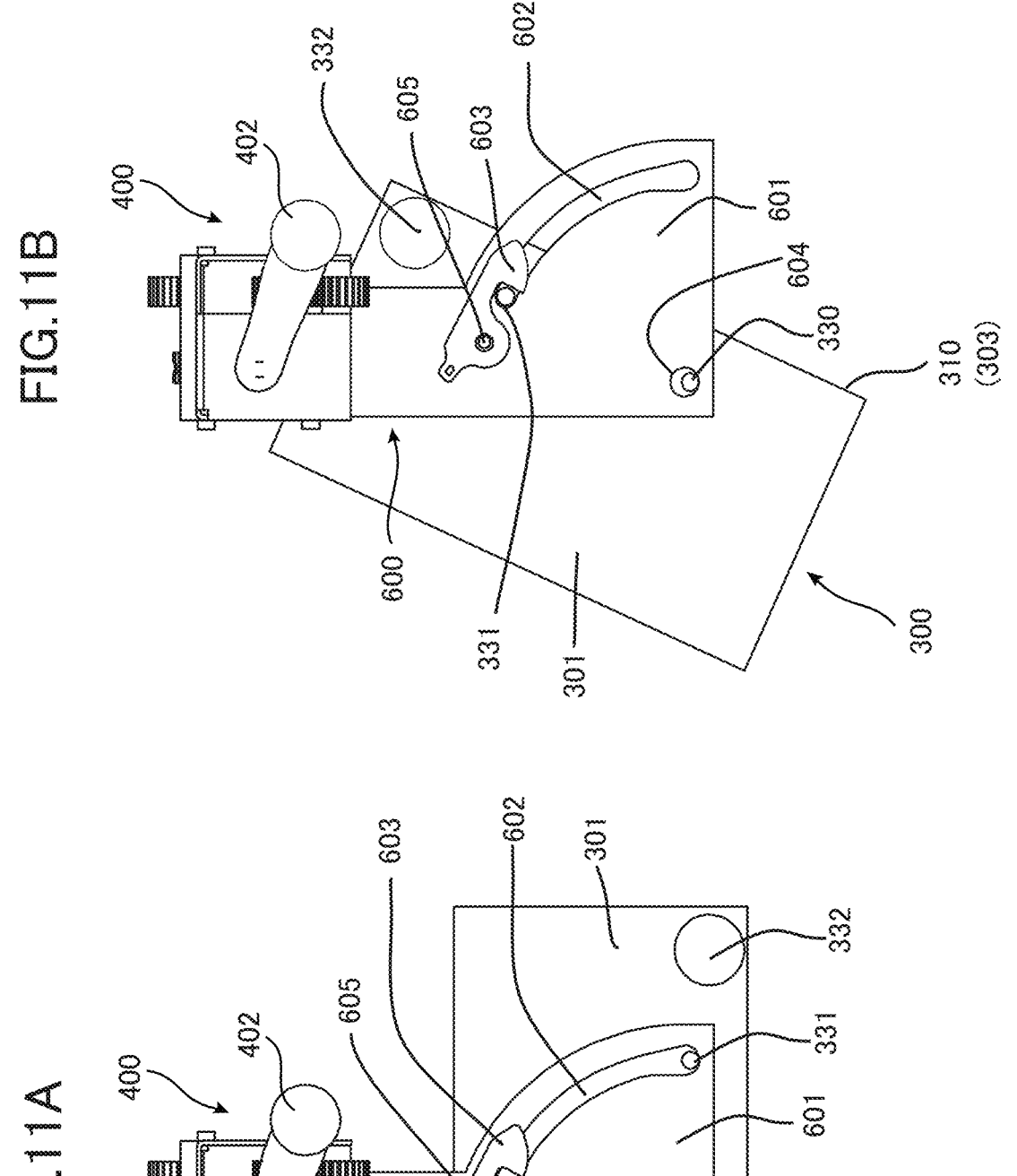
FIG. 11A is a side view of the scanner unit located at the non-facing position.
FIG. 11B is a side view of the scanner unit located at the inclined position.

The rotatable unit 600 will be described using FIGS. 10 to 11B with reference to FIG. 6. FIG. 11A illustrates a case where the scanner unit 300 is located at the non-facing position, and FIG. 11B illustrates a case where the scanner unit 300 is located at the inclined position. As illustrated in FIG. 10, the rotatable unit 600 includes a pair of holding plates 601 extending in the width direction at a distance therebetween in the conveyance direction. As described above, the holding plates 601 are provided below the lifting/lowering portions 403 of the lifting/lowering unit 400 (see FIG. 6), and rotatably holds the scanner unit 300.

As illustrated in FIGS. 10 and 11A, the holding plate 601 serving as a holding portion has a slit 602 formed in an arc shape, a locking portion 603, and a rotation hole 604. On the other hand, the housing 301 of the scanner unit 300 has rotation shafts 330 and engagement protrusions 331 formed to protrude from both side surfaces in the width direction. The direction of the rotation axis of the rotation shaft 330 is a direction along a second direction. The rotation shaft 330 passes through the rotation hole 604 of the holding plate 601, and the housing 301 rotates with respect to the holding plate 601 with the rotation shaft 330 as the rotation center. Further, the engagement protrusion 331 is inserted into the slit 602 of the holding plate 601, and restricts a moving direction of the housing 301 together with the slit 602 when the housing 301 rotates with the rotation shaft 330 as the rotation center.

As illustrated in FIG. 11B, when the scanner unit 300 is located at an inclined position, the locking portion 603 is engaged with the engagement protrusion 331 protruding from the slit 602 to lock the scanner unit 300 (specifically, the housing 301) at the inclined position. In the locking portion 603, an engagement claw for engaging the engagement protrusion 331 is provided at a distal end portion thereof, and an engagement claw side is biased downward by a spring that is not illustrated in such a manner as to be rotatable about a rotatable portion 605. In a case where the scanner unit 300 is rotated from the non-facing position illustrated in FIG. 11A to the inclined position illustrated in FIG. 11B, when the engagement protrusion 331 comes into contact with a leading edge of the locking portion 603, the locking portion 603 is pushed up by the engagement protrusion 331 and retreats upward against the biasing force of the spring. Then, when the scanner unit 300 is further rotated to the inclined position, the locking portion 603 having retreated upward moves downward due to the biasing force of the spring and returns to the original position before the retreat. As the locking portion 603 returns to the original position before retreat in this manner, the engagement claw is engaged with the engagement protrusion 331.

Note that a unit gripping portion 332 to be gripped by the user to rotate the scanner unit 300 is provided on a first end side in the width direction of the housing 301 of the scanner unit 300.

In a case where the user wants to clean the transmission glass 303 of the scanner unit 300, the user needs to move the scanner unit 300 from the separated position (see FIG. 5) to the non-facing position (see FIG. 8), and then move scanner unit 300 from the non-facing position to the inclined position (see FIG. 10). That is, in order to clean the transmission glass 303, the user operates the rotatable unit 600, in a state where the scanner unit 300 is drawn out, to rotate the scanner unit 300 to a predetermined angle at which the transmission glass 303 can be easily cleaned.

Specifically, the user grips the unit gripping portion 332 and rotates the scanner unit 300. Then, the scanner unit 300 moves to the inclined position along the slit 602 of the holding plate 601. When the scanner unit 300 reaches the inclined position, the locking portion 603 is engaged with the engagement protrusion 331, so that the scanner unit 300 is locked not to rotate at the inclined position at the predetermined angle at which the transmission glass 303 can be easily cleaned. As a result, the user can clean the inclined transmission glass 303 in a state where the scanner unit 300 is locked. In addition, in a case where the scanner unit 300 is locked, the user can easily see the transmission glass 303. The predetermined angle at which the transmission glass 303 is easy to clean is an angle of "60° or more and 70° or less" if it is assumed that the angle of the transmission glass 303 is "00" when the scanner unit 300 is located at the non-facing position.

As described above, according to the present embodiment, it is possible to improve user operability when the user cleans the transmission glass 303 of the scanner unit 300. That is, after the user draws out the scanner unit 300 from the casing of the print module 2000 by the drawer unit 500, the user can rotate the drawn-out scanner unit 300 by the rotatable unit 600. Then, the scanner unit 300 is locked in a state where the transmission glass 303 is inclined at a predetermined angle at which it is easy to clean. By drawing the scanner unit 300 out of the casing, a sufficient work space necessary for cleaning the transmission glass 303 can be secured. Further, the visibility of the transmission glass 303 is improved by rotating the scanner unit 300. In this way, when the user wants to clean the transmission glass 303, the user can easily perform an operation of moving the transmission glass 303 to a position where it is easy to clean and it is visible well.

Note that, although the lifting/lowering unit 400, the drawer unit 500, and the rotatable unit 600 are included in the scanner unit 300 so that the transmission glass 303 can be easily cleaned in the above-described embodiment, for example, at least one of the lifting/lowering unit 400 and the rotatable unit 600 among these units 400, 500, and 600 may not be included in the scanner unit 300. In this case as well, if the scanner unit 300 can be moved to the non-facing position by the drawer unit 500, the user can clean the transmission glass 303. Similarly, only the lifting/lowering unit 400 and the rotatable unit 600 may be included in the scanner unit 300 without the drawer unit 500, or only the lifting/lowering unit 400 may be included in the scanner unit 300.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-091096, filed Jun. 1, 2023, which is hereby incorporated by reference herein in its entirety.

What is claimed is:

1. An image reading apparatus comprising:
   a support portion configured to support a second surface of a sheet with an image formed on a first surface of the sheet in a conveyance path where the sheet is conveyed;
   a reading unit disposed on one side opposite to another side on which the support portion is disposed across the conveyance path, and configured to read the first surface of the sheet conveyed in the conveyance path;
   a first movable unit configured to move the reading unit in a second direction, where a conveyance direction in which the sheet is conveyed in the conveyance path is defined as a first direction, a width direction of the first surface of the sheet orthogonal to the first direction is defined as the second direction, and a direction orthogonal to the first direction and the second direction is defined as a third direction; and
   a rotatable portion configured to rotate the reading unit about a first rotation shaft, wherein the first movable unit is configured to move the reading unit between a first position and a second position, wherein the first position is a position where a reading surface of the reading unit and the support portion face each other, and the second position is a position where the reading surface of the reading unit and the support portion do not face each other, wherein the rotatable portion is configured to rotate the reading unit located at the second position to an inclined position where the reading surface is inclined by a predetermined angle.

2. The image reading apparatus according to claim 1, further comprising a second movable unit configured to move the reading unit in the third direction, wherein the second movable unit is configured to move the reading unit located at the first position between a reading position and a separated position further away from the support portion than the reading position, and the first movable unit is configured to move the reading unit located at the separated position between the first position and the second position.

3. The image reading apparatus according to claim 1, further comprising a second movable unit configured to move the reading unit in the third direction, wherein the second movable unit is configured to move the reading unit located at the first position between a reading position and a separated position further away from the support portion than the reading position, and wherein the first movable unit is configured to move the reading unit located at the separated position between the first position and the second position.

4. The image reading apparatus according to claim 3, wherein the rotatable portion includes a pair of holding portions provided in the second movable unit, and configured to hold both end portions of the reading unit in the second direction, wherein the reading unit includes protrusions at both side portions thereof in the second direction, and wherein the pair of holding portions includes arc-shaped slits into which the protrusions are inserted to regulate a moving direction of the reading unit, and at least one of the pair of holding portions includes a locking portion configured to be engaged with one of the protrusions protruding from the arc-shaped slits to lock the reading unit at the inclined position in a case where the reading unit is located at the inclined position.

5. The image reading apparatus according to claim 4, wherein the reading unit includes a unit gripping portion to be gripped while the reading unit is rotated along the arc-shaped slits.

6. The image reading apparatus according to claim 4, wherein the first movable unit includes:

a pair of slide rails extending in the second direction at a distance therebetween in the conveyance direction, and a movable frame configured to hold the second movable unit and move the reading unit along the pair of slide rails between the first position and the second position.

7. The image reading apparatus according to claim 6, wherein the movable frame is provided with a frame gripping portion for moving the movable frame in a sliding manner along the pair of slide rails.

8. The image reading apparatus according to claim 6, wherein the second movable unit includes a second rotation shaft extending in the second direction, a handle provided at a first end portion of the second rotation shaft in the third direction and configured to rotate the second rotation shaft, and a pair of lifting/lowering portions disposed at both end portions of the second rotation shaft in the second direction and configured to lift or lower the pair of holding portions in the third direction as the second rotation shaft rotates, and wherein each of the pair of lifting/lowering portions includes a worm gear fixed to the second rotation shaft, a worm wheel meshed with the worm gear, a pinion gear connected to the worm wheel via a gear shaft, and a rack gear provided in the movable frame with a gear train meshed with the pinion gear being disposed in the third direction.

9. The image reading apparatus according to claim 1, wherein a direction of a rotation axis of the first rotation shaft is a direction along the second direction.

10. The image reading apparatus according to claim 1, wherein the support portion is an endless conveyor belt configured to convey the sheet.

11. The image reading apparatus according to claim 1, wherein the reading unit includes a reading portion configured to read the image on the sheet by emitting light to the sheet that is being conveyed and receiving light reflected from the sheet, a housing configured to house the reading portion, and a transmission portion provided on the reading surface in the housing and allowing the light emitted from the reading portion and the light reflected from the sheet to be transmitted therethrough.

12. An image forming apparatus comprising:

the image reading apparatus according to claim 1; and an image forming portion configured to form the image on the first surface of the sheet, wherein the image reading apparatus is disposed downstream of the image forming portion in the conveyance direction of the sheet.

13. The image forming apparatus according to claim 12, wherein the image forming portion is a recording head configured to form the image on the sheet by ejecting an ink, and wherein the reading unit is disposed downstream of the recording head in the conveyance direction.

14. The image forming apparatus according to claim 13, wherein the image forming apparatus is configured to adjust a position of the recording head based on a reading result read by the reading unit.

* * * * *